DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED SEPTEMBER 29, 1970

878 O.G. 1149

T878,021

USE OF POLYCARBOXYLIC ACIDS AND ACID DERIVATIVES AS ANTIFOGGANTS FOR CERTAIN EMULSIONS

Charles Allen Goffe, Kodak Park Works, Rochester, N.Y. 14650

Filed Mar. 9, 1970, Ser. No. 17,878
**Int. Cl. G03c *1/34***
U.S. Cl. 96—109
No Drawing. 30 Pages Specification

Polycarboxylic acids, anhydrides, imides, esters, and lactones are effective antifoggants for silver halide photographic emulsions sensitized by noble metals and selenium. Examples illustrate that polycarboxylic compounds stabilize photographic systems in which gold and labile selenium are employed as sensitizing agents. Particularly effective antifoggants include maleic acid, maleic anhydride, fumaric acid, succinic acid, succinic anhydride, music acid, diethyl malonic acid, and 1,3,5-tricarboxypentane. The effectiveness of the disclosed antifoggants is enhanced by the presence of a tetraazaindene antifoggant compound, but is not dependent thereupon.